(12) United States Patent
Weber et al.

(10) Patent No.: US 11,367,568 B2
(45) Date of Patent: Jun. 21, 2022

(54) INDUCTIVE COMPONENT AND SECONDARY RESONATOR DEVICE FOR MOUNTING TO AN ELECTRIC VEHICLE

(71) Applicant: SUMIDA COMPONENTS & MODULES GMBH, Obernzell (DE)

(72) Inventors: Mathias Weber, Salzweg (DE); Marco Uczulko, Deggendorf (DE)

(73) Assignee: SUMIDA COMPONENTS & MODULES GMBH, Obernzell (DE)

( * ) Notice: Subject to any disclaimer, the term of this patent is extended or adjusted under 35 U.S.C. 154(b) by 505 days.

(21) Appl. No.: 16/464,512

(22) PCT Filed: Nov. 20, 2017

(86) PCT No.: PCT/EP2017/079734
§ 371 (c)(1),
(2) Date: May 28, 2019

(87) PCT Pub. No.: WO2018/095846
PCT Pub. Date: May 31, 2018

(65) Prior Publication Data
US 2021/0110960 A1  Apr. 15, 2021

(30) Foreign Application Priority Data
Nov. 28, 2016  (DE) .......................... 102016223534.6

(51) Int. Cl.
*H01F 38/14*  (2006.01)
*B60L 53/124*  (2019.01)
(Continued)

(52) U.S. Cl.
CPC ............ *H01F 38/14* (2013.01); *B60L 53/124* (2019.02); *H01F 27/24* (2013.01); *H01F 27/28* (2013.01); *H02J 50/12* (2016.02)

(58) Field of Classification Search
CPC ...... H02F 27/28; H02F 27/24; H02F 27/2823; B60L 11/182; B60L 53/124; H01F 38/14; H02J 5/005; H02J 50/10; H02J 50/12
See application file for complete search history.

(56) References Cited

U.S. PATENT DOCUMENTS 7,492,247 B2   2/2009  Schmidt et al.
7,598,839 B1 * 10/2009  Wedley ................. H01F 27/323
                                              336/212

(Continued)

FOREIGN PATENT DOCUMENTS

CN       104768795 A    7/2015
CN       104969315 A   10/2015
(Continued)

OTHER PUBLICATIONS

German Examination Report dated Oct. 19, 2017, Application No. 10 2016 223 534.6, 6 Pages.

(Continued)

*Primary Examiner* — Adolf D Berhane
(74) *Attorney, Agent, or Firm* — Brooks Kushman P.C.

(57) ABSTRACT

An inductive device comprises a plate-shaped ferrite core and a hybrid double-D solenoid coil which is arranged over the plate-shaped ferrite core and has a plurality of turns. The plurality of turns is grouped into at least two groups, each having at least two immediately consecutive turns which in a group have monotonically increasing or decreasing turn diameters, wherein the last turn of a group has a turn diameter that is larger than that of the first turn of the following group if the turn diameter of the turn immediately preceding the last turn within the group is smaller than the turn diameter of the last turn, or has a turn diameter that is smaller than that of the first turn of the following group if the (Continued)

turn diameter of the turn immediately preceding the last turn is larger than the turn diameter of the last turn.

10 Claims, 8 Drawing Sheets

(51) Int. Cl.
*H01F 27/24* (2006.01)
*H01F 27/28* (2006.01)
*H02J 50/12* (2016.01)

(56) References Cited

U.S. PATENT DOCUMENTS

| | | |
|---|---|---|
| 10,014,104 B2 | 7/2018 | Widmer et al. |
| 10,340,078 B2 | 7/2019 | Widmer et al. |
| 2015/0380157 A1 | 12/2015 | Green et al. |
| 2016/0336818 A1 | 11/2016 | Garcia Briz et al. |

FOREIGN PATENT DOCUMENTS

| | | |
|---|---|---|
| CN | 105375952 A | 3/2016 |
| CN | 105981254 A | 9/2016 |
| DE | 103 12 284 B4 | 12/2005 |
| DE | 20 2016 101 808 U1 | 4/2016 |
| EP | 2 858 078 A1 | 4/2015 |
| JP | 2009-246141 A | 10/2009 |
| WO | 2013/133254 A1 | 9/2013 |
| WO | 2015/094964 A1 | 6/2015 |
| WO | 2016/114893 A1 | 7/2016 |

OTHER PUBLICATIONS

Chinese Office Action dated Jul. 9, 2020 (with English Machine Translation), Application No. 201780073294.2, Applicant Sumida Components & Modules GmbH, 11 Pages.

PCT International Search Report dated Feb. 9, 2018, Application No. PCT/EP2017/079734, Applicant Sumida Components & Modules GmbH, 3 Pages.

* cited by examiner

INDUCTIVE COMPONENT AND SECONDARY RESONATOR DEVICE FOR MOUNTING TO AN ELECTRIC VEHICLE

CROSS-REFERENCE TO RELATED APPLICATIONS

This application is a U.S. national phase of PCT Application No. PCT/EP2017/079734 filed Nov. 20, 2017, which claims priority to German Application No. DE 10 2016 223 534.6 filed Nov. 28, 2016, the disclosures of which are incorporated in their entireties by reference herein.

TECHNICAL FIELD

The present disclosure relates to an inductive device comprising a plate-shaped ferrite core and a hybrid double-D solenoid coil which is arranged over the plate-shaped ferrite core. The present disclosure further relates to a secondary resonator device for mounting to an electric vehicle with a corresponding inductive device.

BACKGROUND

Due to the increasing share of electric power that is generated from renewable energy sources and far-reaching international treaties to reduce greenhouse gases, electric motor vehicles, i.e., motor vehicles with an electric drive, become increasingly important. Electric cars are examples of electric motor vehicles which further comprise passenger vehicles and freight vehicles, such as subway trains, electric bicycles and the like. In general, an electric car is understood to be a motor vehicle for carrying passengers with at least four wheels which is driven by an electric motor as a so-called electric drive and which stores the electrical energy necessary for its locomotion in a traction battery composed of several interconnected battery cells or cell blocks. Since these vehicles do not emit relevant pollutants during operation, they are classified as being emissions-free vehicles as compared to fuel-driven vehicles.

Although electronically controlled electric motors deliver the maximum torque already at a standstill, as compared to internal combustion engines, and a manual transmission is therefore usually not required unlike with a drive using internal combustion engines, and electric motors are quieter and almost free of vibrations during operation as compared to internal combustion engines without directly emitting harmful exhaust gases, the comparatively underdeveloped and non-uniformly regulated charging infrastructure and the resulting low level of flexibility for users of electric vehicles in spontaneously managing longer journeys represents an obstacle to market acceptance.

A further significant difference between electric and fuel-powered vehicles is the comparison of charging times to fueling times for topping up the energy storage. For example, a few minutes of fueling time faces several ten minutes (currently about 30 minutes for an 80% battery charge at high-performance DC charging stations).

However, although all charging systems are based on one standard in terms of charging electric vehicles, different types of charging plugs, which were created specifically for electric vehicles, do exist. As a result, there are currently various charging options available, which, however, are heavily dependent on the manufacturer and the model.

Compared with fuel-powered vehicles, it is possible to advantageously arrange a "charging station" in locations where many vehicles are accommodated even when not in use, such as a garage or permanently assigned parking spaces or company parking lots for company vehicles. Although almost all electric cars can be charged at any normal domestic outlet, a domestic standard single-phase connector with a fuse of 16 A, however, allows for a maximum transmission of 2.3 kW, so that charging an electric car at the domestic outlet would generally take several hours. Furthermore, when charging at the domestic outlet, it is also to be noted that other consumers are possibly already connected to the circuit at the domestic outlet and that restrictions arise for a longer load on the power supply to the domestic outlet for charging an electric car, in particular over several hours.

It does not seem unreasonable to assume that an increase in the acceptance of electric cars is linked, inter alia, to an increase in electromobility and that the improvement in usability of electric vehicles can there have a major impact.

One approach to the improvement provides e.g., non-contact charging without open contacts, in which energy is transferred in a contactless manner to the car when driven or parked by way of induction for charging the batteries on board the electric vehicle. Opportunities to increase market acceptance arise since handling plugs and charging cables by the user is eliminated.

A contactless charging system for electric cars generally comprises a primary resonator device configured to output electrical energy and a secondary resonator device configured to receive the electrical energy output by the primary resonator device.

In the case of wireless energy transmission, there are fundamentally two principles that differ in their physical properties: Firstly, wireless energy transfer in the near field, also referred to as a non-radiative coupling. This includes e.g., the inductive coupling based on the magnetic flux that is generated in the primary resonator device and detected by the secondary resonator device. Secondly, transfer of energy in the far field, also referred to as radiative energy transfer, which is based on electromagnetic waves.

Wireless energy transfer in the near field (see above, firstly) is limited in terms of the reach of energy transfer to distances that are small compared to the wavelength of the energy-transmitting radiation.

Energy transfer in the far field is limited to the transfer of a comparatively small output, since the so-called free-space path loss (i.e., the reduction of power density in the propagation of electromagnetic waves in free space without interference from additional damping media or interference from reflection) allows for only a very low degree of efficiency of less than 1%.

For contactless charging of electric vehicles, present charging systems are therefore aimed at the near field transfer of electromagnetic energy by largely inductive coupling, in which a primary coil or transmitting coil is embedded in the ground, e.g., pavement or parking lot, while a secondary coil or receiving coil is attached to the electric vehicle, for example, the underbody. Mounting above ground is also possible in the private sector, where the primary or transmitting coil protrudes at least in part from the ground.

Known coil configurations for primary and/or secondary coils shall be described below with regard to FIGS. 1A, 1B and 10.

Figure 1A:
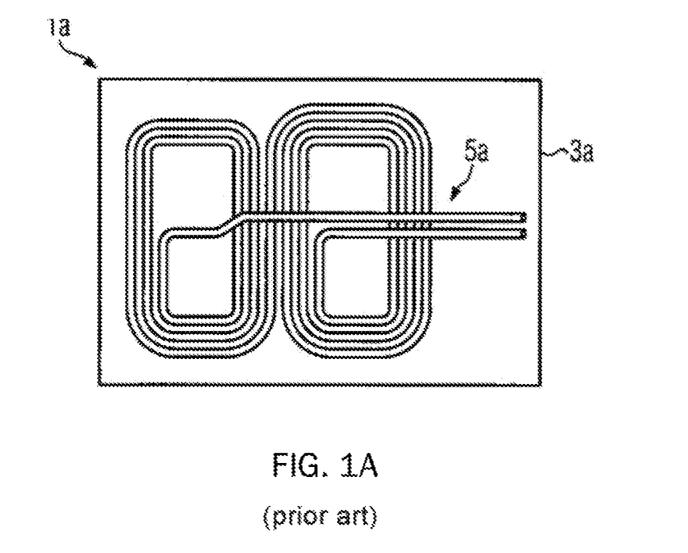
FIGS. 1A-1C schematically illustrate known coil designs.

FIG. 1A schematically shows a top view onto a coil 1$a$ according to a so-called "double-D coil design". A winding 5$a$ is there disposed on a magnetic core 3$a$ according to the configuration illustrated, in particular, the individual turns of winding 5$a$ do not run around magnetic core 3$a$.

Figure 1B:
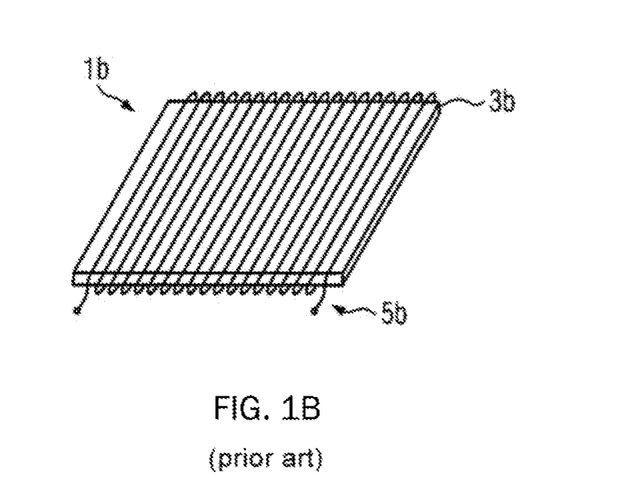
Figure 1C:
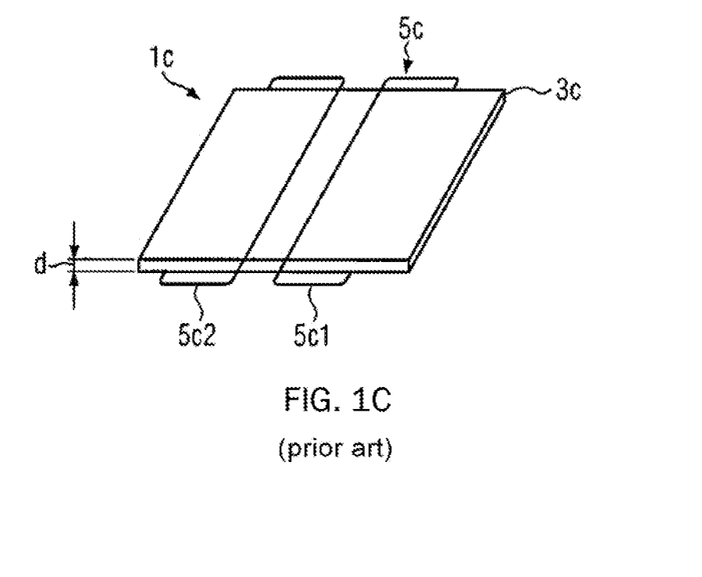

FIG. 1B schematically shows a coil 1b according to a so-called "solenoid coil design", according to which a winding 5b is arranged over a magnetic core 3b, so that the individual turns of winding 5b run around magnetic core 3b.

FIG. 1C shows a coil 1c according to a so-called "hybrid double-D solenoid coil design" which represents a combination of the double-D coil design in FIG. 1A and the solenoid coil design in FIG. 1B. Coil 1c there comprises a winding 5c over a magnetic core 3c, comprising a turn 5c1 and a further turn 5c2, where turns 5c1 and 5c2 are wound at an angle to magnetic core 3c. This means that a turn axis of each of turns 5c1, 5c2, i.e., an axis perpendicular to a plane in which turns 5c 1 and 5c 2 are disposed, respectively deviates by less than 45° from a thickness direction in FIG. 1C denoted with the reference numeral d.

On the other hand, it can be seen with respect to FIG. 1B that a turn axis of winding 5b is oriented substantially perpendicular to the thickness direction of magnetic core 3b ("d" in FIG. 1C would also need to be defined accordingly for FIG. 1B), in particular the turn axis of winding 5b, i.e., an axis perpendicular to a plane in which the turns of windings 5b are located, is oriented at an angle of more than 45° relative to the thickness direction.

Known coil topologies for wireless energy transfer are described e.g., in publication WO 2015/094964 A1.

A device for wireless charging of electric vehicles is described, for example, in document WO 2016/114893 A1.

A secondary device for a charging device for charging electric vehicles is known, for example, from publication EP 2858078 A1.

In view of an improvement of electromobility, it is an object to provide a specific coil design for inductively charging of an electric vehicle, e.g., an electric car, where improved output power, for example, above 7 kW, can be transferred at an improved degree of efficiency, while maintaining a compact design. Furthermore, one object is to provide a coil design which at least reduces self-heating due to power losses.

In the development of charging systems, general conditions are to be complied with regarding other aspects, such as e.g., available space, predetermined minimum efficiency, predetermined minimum transfer power, predetermined minimum electric strength, requirements in terms of stability, etc.

SUMMARY

The above problems and objects are solved in the context of the present disclosure by an inductive device and a secondary resonator device for mounting to an electric vehicle In one aspect of the present disclosure, an inductive device with a plate-shaped ferrite core and a hybrid double-D solenoid coil disposed over the plate-shaped ferrite core having a plurality of turns is provided, wherein the plurality of turns is grouped into at least two respective groups of at least two immediately consecutive turns. Turn diameters of the turns in a group increase or decrease monotonically, the turn diameter at the transition of a last turn of a group to the immediately following first turn of the immediately subsequent group decreasing (in the case of monotonically increasing turn diameters in the groups) or increasing (in the case monotonically decreasing turn diameters in the groups). This enables a unique allocation of individual turns of the hybrid double-D solenoid coil to groups. The grouping of the plurality of turns defined accordingly realizes an interleaved or respectively distributed winding in the coil winding, where an overly large space requirement for the turns caused by an increasing bulge due to continuously increasing turn diameters, is prevented. On the other hand, the turns increase due to the winding pattern with groups only within the groups to a maximum turn diameter depending on the number of turns per group.

In contrast thereto, the known double-D coil design, as shown, for example, in FIG. 1 A, leads to turn diameters which increase in proportion to the number of turns.

In an advantageous embodiment of the inductive device described above, the plate-shaped ferrite core comprises at least one stepping which is in part overlaid by the hybrid double-D solenoid coil. A reduction in construction height at the stepping can be obtained.

In an illustrative embodiment herein, the at least one stepping is formed in two respectively oppositely disposed surfaces of the plate-shaped ferrite core, which are oriented perpendicular to a thickness direction of the plate-shaped ferrite core. In this case, the at least one stepping in each of the two mutually opposite surfaces along the thickness direction provides an offset. This represents a simple and efficient way to provide the stepping from an optimization perspective in terms of the construction height.

In another advantageous embodiment of the inductive device, the hybrid double-D solenoid coil comprises a first winding arranged over the plate-shaped ferrite core and having a first plurality of turns and first terminal contacts and a second winding having a second plurality of turns and second terminal contacts. The first and second terminal contacts are connected to terminals of the inductive device such that an electric current passes through the first winding and the second winding that has a mutually opposite rotational direction, when a voltage is applied to the terminals. The first winding and the second winding of the hybrid double-D solenoid coil design according to the above-described aspect of the disclosure are here connected in parallel to terminals so that a reduction in the ohmic resistance along the hybrid double-D solenoid coil design and power loss is reduced.

The connection configuration presently defined, according to which an electrical current flowing through the first winding and the second winding has a rotational direction that is mutually opposite to each other when a voltage drop is applied to the terminals of the inductive device, enables a magnetic field configuration during operation which causes an advantageous coupling to a further inductive device as a secondary element or primary element in a charging system.

In an illustrative embodiment, the plate-shaped ferrite core comprises two pole sections, which are arranged relative to a direction obtained by projecting a turn axis of the first winding and/or the second winding onto the plate-shaped ferrite core at opposite ends of the plate-shaped ferrite core, and a connecting section disposed between the pole sections, wherein each pole section is arranged from the connecting section along a thickness direction of the plate-shaped ferrite core, while forming a stepping in the ferrite core. This can achieve an optimization of the construction height while maintaining advantageous coupling properties by way of the pole sections arrange in an offset manner.

In another illustrative embodiment, each pole section comprises a pole section at least in part exposed which is oriented perpendicular to the thickness direction and is not overlaid by turn sections. This allows for an advantageous coupling behavior of the inductive device to a further inductive device, which acts as a primary or secondary element.

In another advantageous embodiment of the inductive device, the hybrid double-D solenoid coil is wound in a single layer over surfaces of the plate-shaped ferrite core which are oriented perpendicular to a thickness direction of the plate-shaped ferrite core. An advantageous construction height along the thickness direction is then obtained in this embodiment by the single-layer winding.

In one further advantageous embodiment of the inductive device, the inductive device further comprises a winding element having arranged on a surface of the plate-shaped ferrite core at least one support member, which comprises a respective plurality of grooves, each of which receiving exactly one turn section of the turns arranged above the support member. It is therewith possible to provide an advantageous construction height while at the same time providing insulation between turns in order to prevent the turns from short circuiting. This embodiment is particularly advantageous in the production of the inductive device.

In another advantageous embodiment of the inductive device, lead sections extending from terminal contacts to turns are routed laterally on the inside and overlaid by turn sections. The lead sections providing the connection between the terminal contact and the turn are here protected from potential damage, and at the same time, lateral dimensions perpendicular to the thickness direction of the inductive device are minimized by the optimum utilization of inner spaces formed between the turns and the ferrite core.

In another aspect, the present disclosure provides a secondary resonator device for mounting to an electric motor vehicle. According to present illustrative embodiments, the secondary resonator device comprises a housing, a capacitive component, and the inductive device according to the aspect described above, where at least the inductive device is received in the housing.

In this aspect, a secondary resonator device with a small construction space and advantageous coupling characteristics is provided for use in the contactless charging of electric vehicles. The housing can there be used, for example, as a shielding element and/or a heat sink, depending on the material.

BRIEF DESCRIPTION OF THE DRAWINGS

Further advantages and illustrative embodiments of the aspects of the disclosure illustrated above are described below with reference to the accompanying drawings, in which.

DETAILED DESCRIPTION

An inductive device 100 according to several illustrative embodiments of the present disclosure is described below in detail with reference to FIGS. 2A to 2D.

Figure 2A:
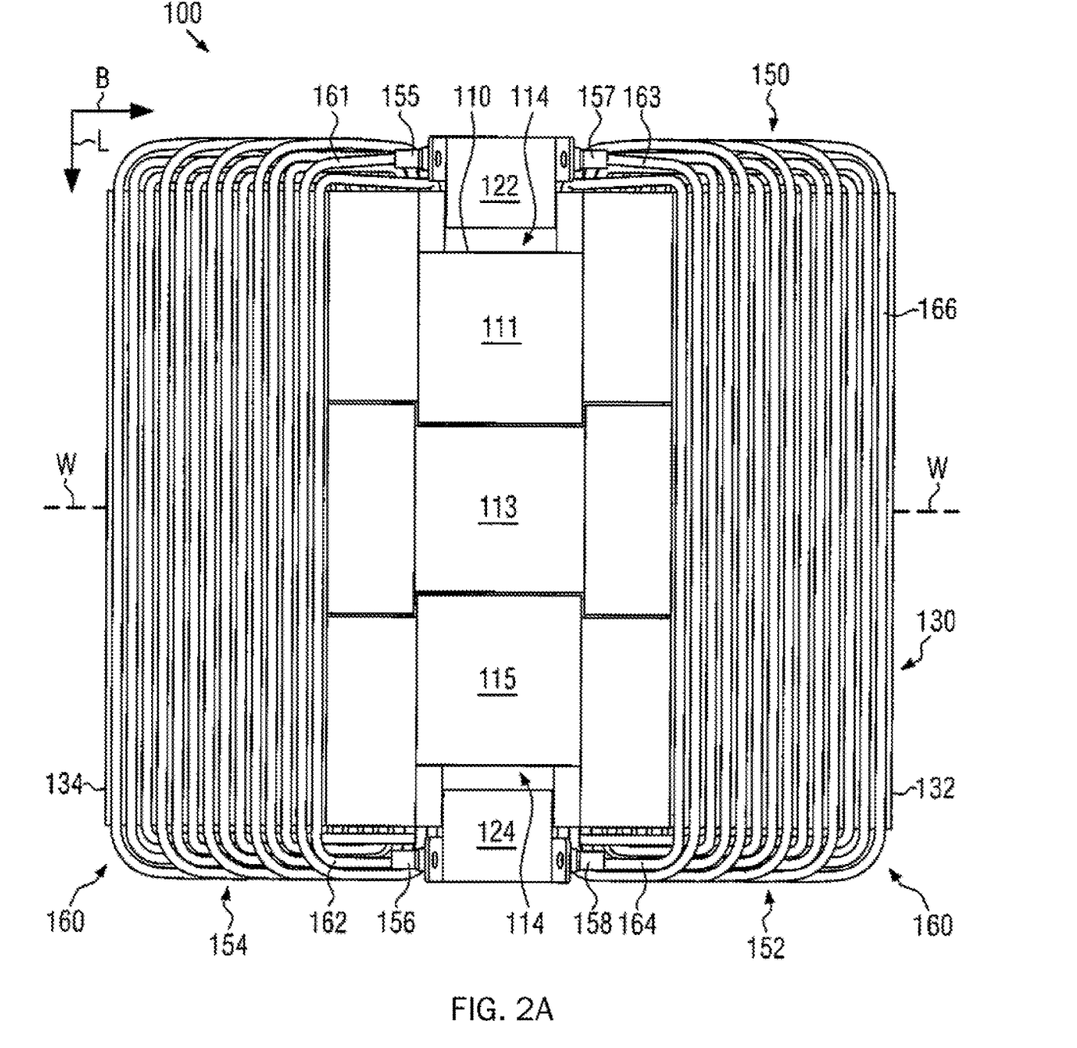
FIG. 2A shows a top view onto an inductive device according to several detailed embodiments of the present disclosure.

FIG. 2A shows a top view onto a top side of inductive device 100. The term "top side" shall below refer to the side of the inductive device 100 which is arranged opposite to a "bottom side" of inductive device 100, which in turn faces a further inductive device (not shown) in a system for contactless charging of an electric vehicle (not shown).

In an illustrative example, inductive device 100 may be attached to an electric vehicle (not shown). Furthermore, inductive device 100 may be attached such that the top side faces a vehicle underbody, while the bottom side faces a ground (not shown), such as a pavement, a parking lot floor, a garage floor, etc.

In another illustrative example, inductive device 100 may be disposed on or in the ground (not shown), such as a pavement, a parking lot floor, a garage floor, etc., for example embedded therein. The bottom side would here face a vehicle underbody (not shown) of an electric vehicle (not shown).

Inductive device 100 comprises a plate-shaped ferrite core 110 and a hybrid double-D solenoid coil 150 which is arranged above plate-shaped ferrite core 110 and has a plurality of turns 160. The plurality of turns 160 is here formed by multiple turns (i.e., at least four turns). A turn is designated in FIG. 2A by way of example with reference numeral 166. Accordingly, reference numeral "166" represents a single turn of the plurality of turns 160, according to one illustrative and non-restricting example turn 166.

The plurality of turns 160 is grouped into a plurality of groups, each made of several immediately consecutive turns, in a manner to be discussed in greater detail below.

As shown in FIG. 2A, plate-shaped ferrite core 110 is formed from a plurality of individual ferrite plates 111, 113, 115 which are joined together to form plate-shaped ferrite core 110. Alternatively, plate-shaped ferrite core 110 may be formed integrally, in particular from a single plate-shaped ferrite element, in which case no joints are present in plate-shaped ferrite core 110, contrary to the illustration in FIG. 2A.

According to several illustrative embodiments, as illustrated in FIG. 2A by way of example, plate-shaped ferrite core 110 may comprise lateral recesses 114 into which, e.g., terminals 122, 124 of the inductive device are accommodated in a space-saving manner, the lateral dimensions of the inductive device being kept small. Additionally or alternatively, capacitive components (not shown), such as at least one capacitor, may be accommodated in recesses 114.

Figure 2B:
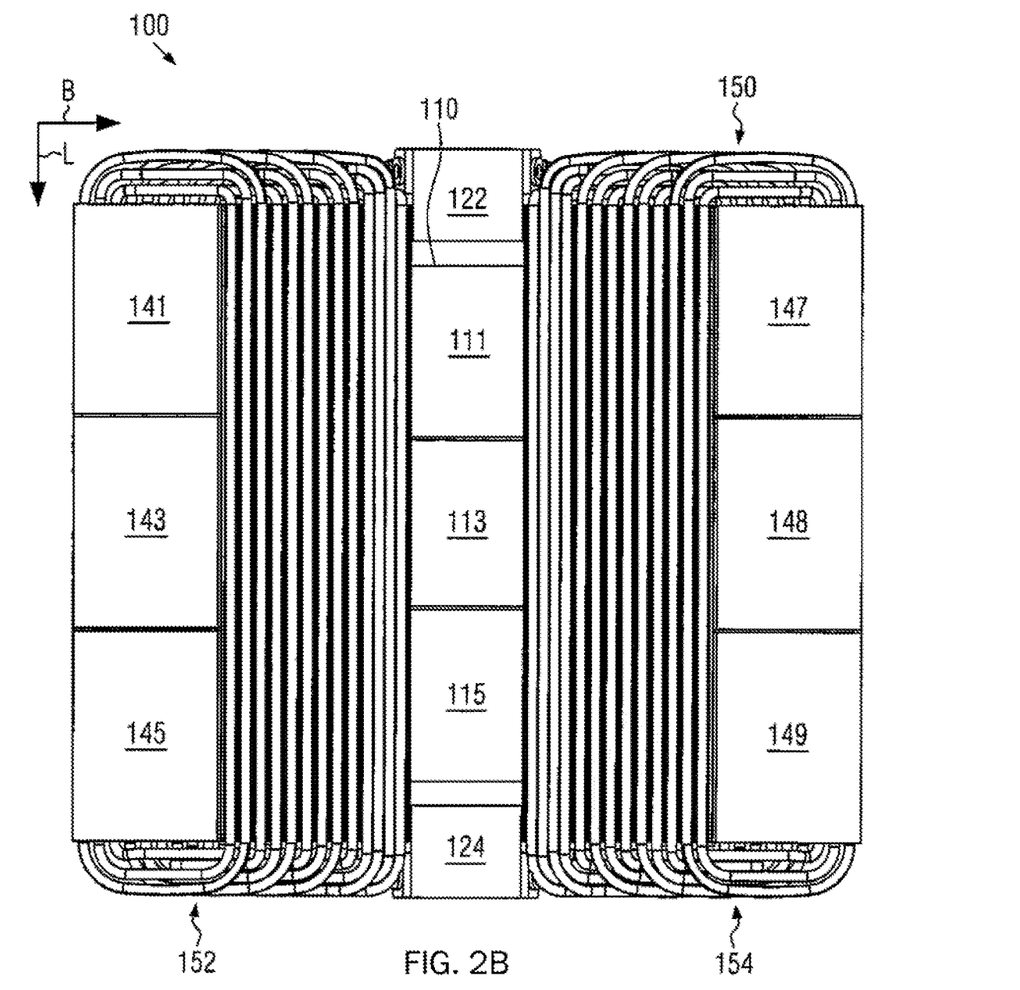
FIG. 2B shows a bottom side view of the inductive device of FIG. 2A.

As illustrated in FIG. 2A by way of example, recesses 114 are provided according to exemplary embodiments as tapered sections of ferrite core 110, wherein a lateral dimension of ferrite core 110 in recesses 114 is smaller than a lateral dimension of ferrite core 110 outside recesses 114 in relation to a longitudinal direction of ferrite core 110 being designated in FIGS. 2A and 2B with reference character L. A direction perpendicular to the longitudinal direction L is referred to as the width direction and is designated in FIGS. 2A-2D with reference character B.

According to illustrative embodiments of the present disclosure, the following may be true for the dimensions in the longitudinal direction L and the width direction B: $L>B$, $L\approx B$ or $L<B$.

Figure 2C:
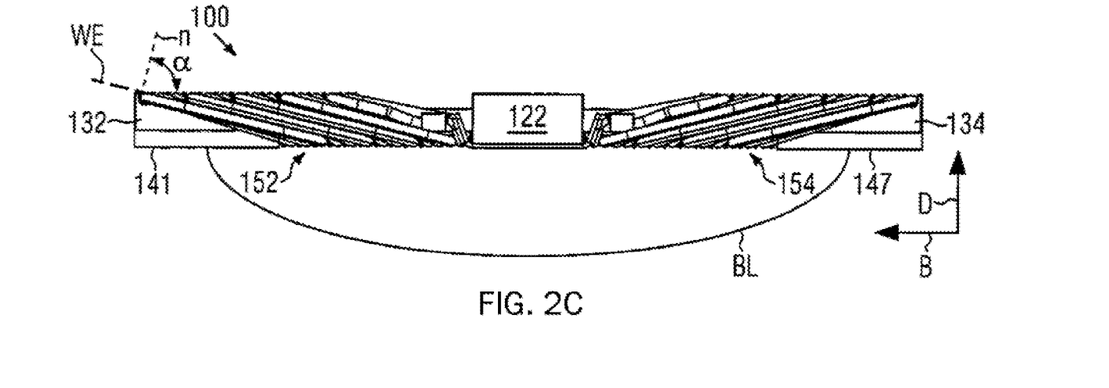
FIG. 2C shows an inner side sectional view of the inductive device shown in FIGS. 2A and 2B.
Figure 2D:
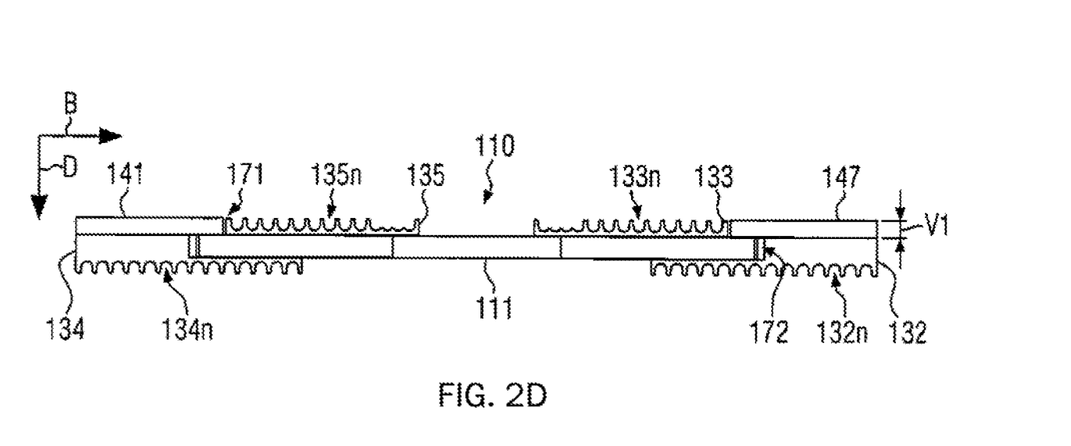
FIG. 2D shows a side sectional view of the ferrite core with the winding element for FIGS. 2A-2C.

A direction perpendicular to directions L, B is referred to in FIGS. 2C and 2D as a thickness direction D. With respect to thickness direction D, ferrite core 110 has dimensions that are smaller than the dimensions along directions L and B: D<L, B.

According to specific exemplary embodiments, it may be that: D<L/10 and/or D<B/10. According to preferred embodiments, D<L/20 and/or D<B/20. According to specific present illustrative examples, it may be that: D<L/30 and/or D<B/30. The resulting aspect ratios with respect to D and L, B clearly illustrate ferrite core 110 as a "plate-shaped ferrite core", and a thickness direction is identified as a direction along which the "plate-shaped ferrite core" has the smallest extension, without any recesses, e.g., the recesses 114, being taken into account.

According to illustrative embodiments, the hybrid double-D solenoid coil 150 comprises a first winding 152 and a second winding 154, each comprising a plurality of (more preferably two or three or more) turns. In the top view onto the top side of inductive device 100 shown in FIG. 2A, the first winding 152 is arranged with respect to the width direction B at an end of plate-shaped ferrite core 110 that is disposed opposite to second winding 154, or turn sections of the plurality of turns of the first winding 152 (for example, turn 166 in FIG. 2A) extend over at least the largest part of plate-shaped ferrite core 110 substantially parallel to the longitudinal direction L, respectively. FIG. 2A shows the special case that the turn sections extend over the plate-shaped ferrite core 110 of the first winding 152 parallel to the longitudinal direction L as long as the turn sections of the first winding 152 in the view shown in FIG. 2A extend directly over the plate-shaped ferrite core 110, while turn sections to the side of the plate-shaped ferrite core 110 take an arcuate course and, with regard to the view shown in FIG. 2A, are routed behind plate-shaped ferrite core 110 toward the bottom side of inductive device 100. The same applies to the second winding 154. However, this does not constitute any restriction and a different orientation of the turn sections may be implemented, e.g., at askew to the longitudinal direction L.

The first winding 152 is electrically and mechanically connected to terminals 122, 124 of the inductive device by way of terminal contacts 157, 158, wherein terminal contacts 157 and 158 are connected via respective lead sections 163 and 164 to the plurality of turns of the first winding 152. The terminal contacts 157, 158 and terminals 122, 124 may be electrically and mechanically connected to each other by any means, for example, by way of a crimp connection, screw connection, plug connection, solder connection and the like. Accordingly, second winding 154 is connected to terminals 122, 124 by way of terminal contacts 155, 156, where terminal contact 155 is connected to the plurality of turns of first winding 154 by way of lead section 161, and terminal contact 156 is connected to the plurality of turns of second winding 154 by way of lead section 162.

Lead sections 161, 162, 163, 164 extend substantially parallel to the width direction B at the side of plate-shaped ferrite core 110 and, according to illustrative embodiments, are routed on the inside, wherein lead sections 161, 162, 163, 164 according to illustrative embodiments are routed along the longitudinal direction L at a smaller distance to the side surfaces of plate-shaped ferrite core 110 than the most distant turn sections of the plurality of turns of the first and second windings 152, 154. Alternatively, lead sections 161, 162, 163, 164, according to an external implementation of lead sections 161-164, may be arranged at a greater distance to plate-shaped ferrite core 110 than the outermost turn sections of the plurality of turns of first and second windings 152, 154. In the latter case (not shown), lead sections 161-164 are not overlaid by turn sections of the plurality of turns of the first and second windings 152, 154.

With reference to FIG. 2B, a top view onto a bottom side of the inductive device 100 is illustrated contrary to the top view onto the top side according to the illustration in FIG. 2A. When comparing FIGS. 2A and 2B, it arises that turn sections of the turns of the first and second windings 152, 154, which in the illustrated top views of FIGS. 2A and 2B are routed directly over the plate-shaped ferrite core 110, due to an angled position of the turns of first and second windings 152, 154 in the case of the top side in FIG. 2A, may be arranged with respect to the width direction B, for example, at a greater distance to each other than in the case of the view in FIG. 2B showing the bottom side, in which the turn sections of the turns of first and second windings 152, 154 are routed along the width direction B, e.g., at a small distance as compared to FIG. 2B, so that pole sections 141, 143, 145 of plate-shaped ferrite core 110 are formed toward one end of plate-shaped ferrite core 110 in the width direction B and with regard to the width direction B at the opposite end as exposed pole sections 147, 148 and 149, while in the top view onto the top side of FIG. 2A, only the plate-shaped ferrite core 110 is exposed at connecting sections 111, 113, 115 disposed therebetween, which are arranged as shown in FIG. 2B between the pole sections 141, 143, 145 and 147, 148, 149.

With reference to FIG. 2C, a side view of the inductive device 100 of FIGS. 2A and 2B is shown which arises in FIG. 2B, for example, in that the inductive device 100 shown in FIG. 2B is tilted upright out of the illustrated paper plane, so that the view is laterally perpendicular onto terminal 122. In the lateral view shown in FIG. 2C, the angled position of the turns of first and second windings 152, 154 with respect to the width direction B may be seen, i.e., that a normal to a plane formed by a turn of the first winding 152 is oriented at an oblique angle to the width direction B, as indicated by a schematic winding plane WE in FIG. 2C with respect to a normal n, where an angle $\alpha$ denotes an angle between the normal n and the width direction B. The angle $\alpha$ is unequal to 0° and, according to specific illustrative embodiments, e.g., greater than or equal to 5° ($\alpha \geq 5°$), without this restricting the present disclosure. The same applies to the second winding 154, where the first winding and the second winding may be wound mirror-symmetrically with respect to an axis of symmetry oriented parallel to the thickness direction D between the first and the second winding.

According to illustrative embodiments, as shown in FIGS. 2A to 2C, the inductive device 100 comprises a winding element 130 having a first support member 132 configured to receive and support the first winding 152 and a second support member 134 configured to receive and support the second winding. Support members 132 can have, for example, an elongated plate-like shape that at least in part covers ferrite core 110 along longitudinal direction L and is formed from electrically insulating material such as by injection molding or the like.

With regard to FIG. 2D, the plate-shaped ferrite core 110 is shown in FIG. 2C without terminal 122 and first and second winding 152, 154 with terminal contacts. According to the illustration in FIG. 2D, in particular only the plate-shaped ferrite core 110 and winding element 130 are shown in a lateral view.

According to illustrative examples of the present disclosure, as illustratively shown in FIG. 2D, the plate-shaped ferrite core 110 comprises a first stepping 171 and a second stepping 172. According to stepping 171, an exposed surface of the pole section 141 is disposed offset relative to the connecting section 111 along the thickness direction D, i.e., an offset V1 is formed by stepping 171 between an alike oriented surface of the connecting section 111 relative to the exposed pole surface of the pole section 141. Accordingly, the pole section 147 is offset relative to the connecting section 111 by stepping 172, the offset is in particular formed between the exposed pole surface of the pole section 147 and the alike oriented surface of the connecting section 111. This is no restriction of the present disclosure, and only one of steppings 171, 172 may be formed instead of the two steppings 171, 172. Alternatively, steppings 171 and 172 may be formed such that an offset associated with stepping 171 is unlike an offset associated with second stepping 172.

According to the exemplary illustration in FIG. 2D, the winding element 130 comprises support members 132, 133, 134, 135, where the support members 133, 135 are formed next to corresponding steppings 171, 172, so that they in part overlay the connecting section 111, while the pole section 141 or the pole section 147, respectively, is not overlaid by the support member 135 and 133. On the other hand, the support members 132, 134 are formed such that steppings 171, 172 are overlaid by the support members 132, 134 on the top side of plate-shaped ferrite core 110.

The support member 132 comprises a plurality of grooves 132n corresponding to the number of turns of the second winding, as shown in FIG. 2C. The support member 133 comprises a plurality of grooves 133n corresponding to the number of turns of the second winding 154 and corresponding to the number of grooves 132n of the support member 132. The same applies for the support members 135 and 134 with regard to the first winding 152 from the illustration in FIG. 2C.

Grooves 132n, 133n, 134n, and 135n each receive a turn section of a turn over the top side and bottom side of the plate-shaped ferrite core 110, respectively, and insulate adjacent turn sections from each other along the top side and bottom side of plate-shaped ferrite core 110 from each other, so that short-circuiting of the turns can be prevented if e.g., a sheathing for the turn sections is omitted. In addition, the support members 132, 133, 134, 135 contribute to the mechanical fixation and stabilization of the first and second windings 152, 154.

FIG. 2D shows an exemplary embodiment of the winding element 130 in which several grooves of support members 133, 135 are less deep or have partition walls of lesser height. These exemplary embodiments serve merely to illustrate configuration options of the support members 133, 135 due to construction space and do not constitute any restriction of the present disclosure. Alternatively, the grooves of support member 133 and/or 135 can be as uniform as possible (i.e., with as uniform a depth as possible or uniformly high partition walls, where "as possible" means a tolerable deviation from the ideal case in the range of manufacturing tolerances, e.g., deviations of about 5% or about 10% from a predetermined size).

A connection configuration of the first and second winding 152, 154 to the terminals 122, 124 of the inductive device 100 shall be described with reference to FIG. 2C. The first winding 152 is in this case electrically connected by way of the terminal contacts 157, 158 to the terminals 122, 124 (cf. FIG. 2A with regard to the terminal contacts of first winding 152) and the second winding 154 is electrically connected by way of the terminal contacts 155, 156 to the terminals 122, 124 of the inductive device 100. When a voltage is applied to the terminals 122, 124 of the inductive device 100 in the first winding 152 and in the second winding 154, an electrical current is caused during operation which flows through the first winding 152 according to the turn direction of the first winding 152 in a the first direction of rotation, while the flow through the second winding 154 is according to the turn direction of the second winding 154 in a second direction of rotation, where the first direction of rotation and the second direction of rotation are oriented opposite to each other. This results in a magnetic field, as shown by a schematically drawn B-field line BL in FIG. 2C. Specifically, the B-field line BL exits one of pole sections 141, 147 and enters the other of pole sections 141, 147, as determined by the orientation of the electrical current in the first and second windings 152, 154. In the plate-shaped ferrite core 110, the back iron of B-field line BL is between pole sections 141, 147 of the inductive device 100, which is described with regard to FIGS. 2A-2D. The inductive device 100 therefore exhibits a good coupling property to a further inductive device, not shown, where it is insensitive to lateral displacements of two inductive devices relative to each other as compared to a coil design according to the known coil design as shown in FIG. 1A and exhibits an advantageous coupling behavior as compared to the coil design in FIGS. 1B and 10.

A winding pattern according to an illustrative embodiment of the present disclosure is described in more detail with reference to FIGS. 3A and 3B.

Figure 3A:
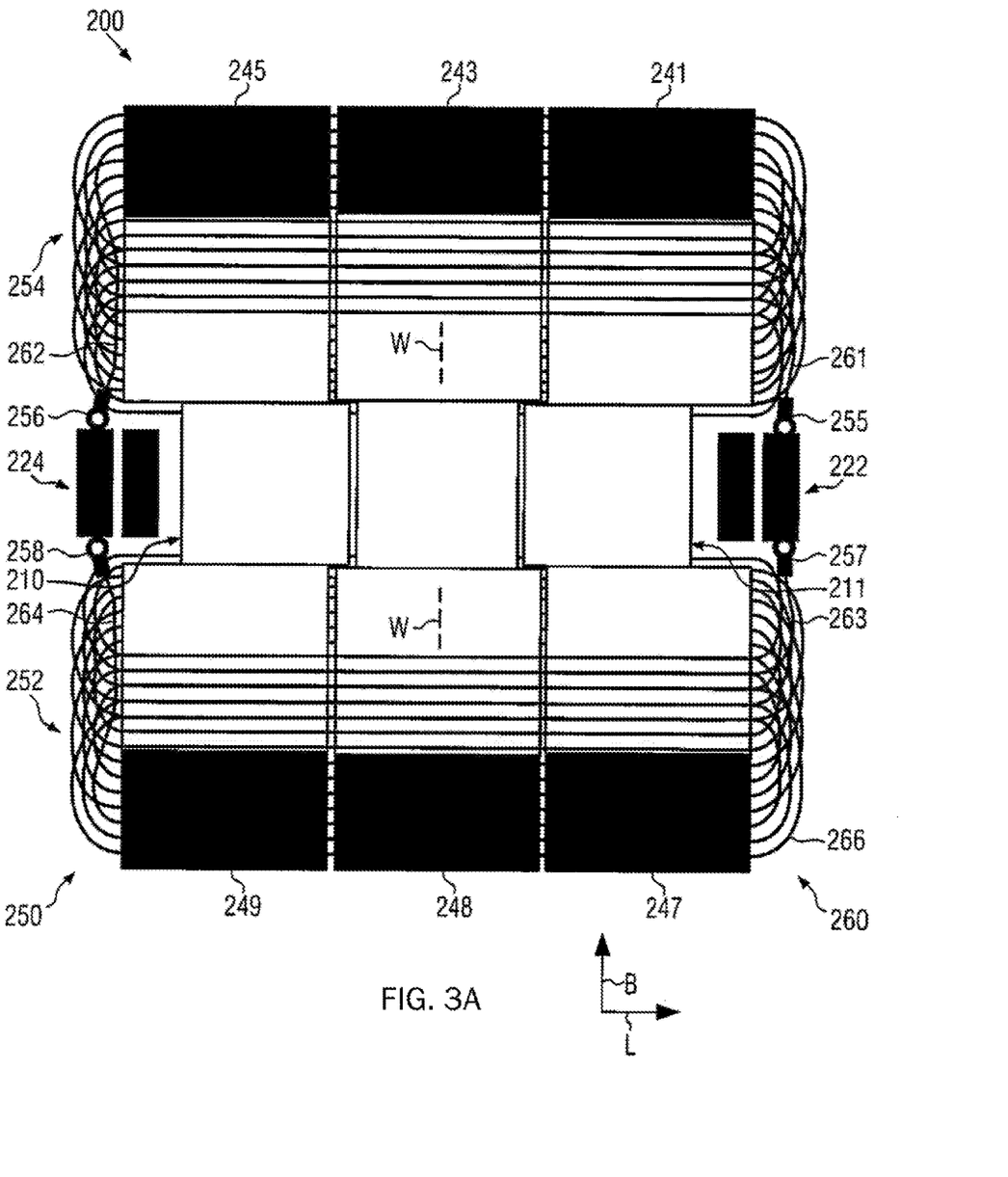
FIG. 3A shows schematically a top view of a winding pattern according to illustrative embodiments of the present disclosure.

FIG. 3A schematically shows an inductive device 200 similar to the inductive device 100 described above. The inductive device 200 comprises a plate-shaped ferrite core 210 similar to plate-shaped ferrite core 110 described above. The inductive device 200 further comprises a hybrid double-D solenoid coil 250, similar to the hybrid double-D solenoid coil 150 described above. The hybrid double-D solenoid coil 250 comprises a first winding 252 and a second winding 254, each having a plurality of turns, where only one turn 266 is schematically shown in FIG. 3A and is representative of further turns which were not provided with reference numerals for the sake of clarity. The first winding 254 and the second winding 252 likewise provide a plurality of turns 260, in particular four turns or more.

According to illustrative embodiments, the inductive device 200 comprises terminals 222, 224 similar to the terminals 122, 124 of the inductive device 100 described above, which are connected to the terminal contacts 255, 256, 257, 258 similar to the terminal contacts 155, 156, 157, 158 of the inductive device 100 described above by way of lead sections 261, 262, 263, 264 similar to the lead sections 161, 162, 163, 164 of the inductive device 100 described above.

Similar to the plate-shaped ferrite core 110 described above, the plate-shaped ferrite core 210 comprises a connecting section 211 and pole sections 241, 243, 245 and 247, 248, 249.

According to illustrative embodiments, the plate-shaped ferrite core 210 may be assembled from a plurality of ferrite plates or formed from a single plate-shaped ferrite core element.

In the illustration of FIG. 3A, projections of turn axes of the first and second windings 252, 254 are drawn in schematically by way of dashed lines and provided with reference character "W", wherein the turn axes defined in the context of this disclosure as normals to turn planes formed by turns, in fact project at an angle out of the paper plane or form an angle unequal to 90° with a normal of the paper plane, respectively, due to the angled position of the turns of the first winding 252 and due to the angled position of the turns of the second winding 254.

This understanding of the "turn axis" differs from the understanding of the turn axis from the manufacturing perspective in that the turn axis W from a manufacturing perspective is oriented parallel and not at an angle out of the paper plane toward the main axis. In the manufacturing process, the angled position of the turn arises by tracking the wire feed in direction B.

Figure 3B:
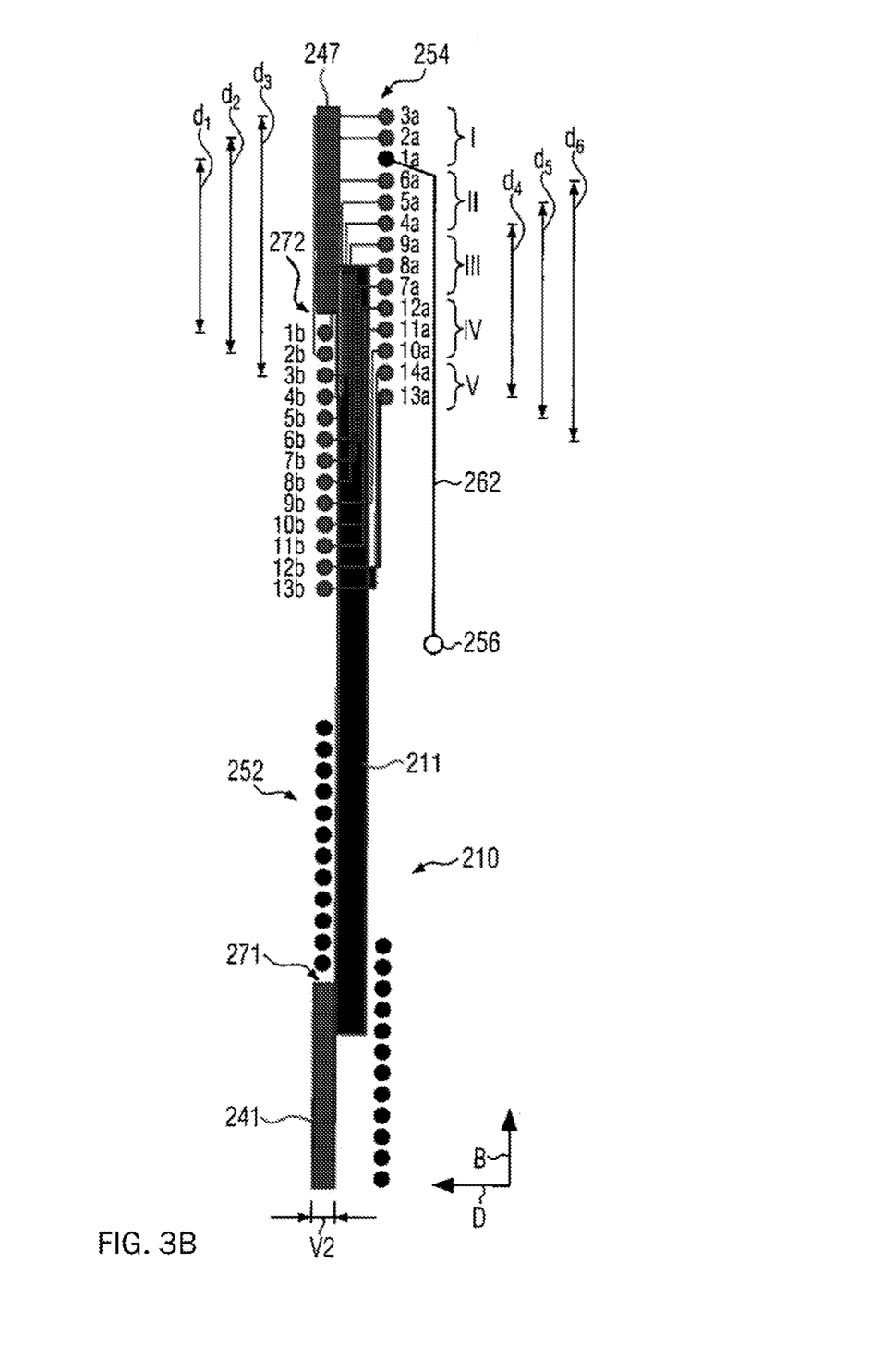
FIG. 3B shows schematically the winding pattern of FIG. 3A in a cross-sectional view.

The width direction B, longitudinal direction L and thickness direction D are defined in FIGS. 3A and 3B similar to the inductive device according to the illustration in FIGS. 2A-2D.

A winding pattern according to illustrative embodiments of the present disclosure is schematically illustrated with reference to FIG. 3B, where connecting lines between above and below the connecting section 211 of the plate-shaped ferrite core 210 of the second winding 254 are connected by lines for better illustration to indicate which top side turn section is connected to which corresponding bottom side turn section with regard to the plate-shaped ferrite core 210.

According to illustrative embodiments of the present disclosure, the second winding 254 is grouped into a first group I, a second group II, a third group III, a fourth group IV and a fifth group V. According to non-restricting embodiments, a sequence of the numbering of the groups can run from the terminal contact 256 via the lead section 262 to the first turn 1a-1b-2a that runs once around the plate-shaped ferrite core 210 and comprises immediately consecutive turn sections 1a, 2a and 1b.

For example, a second turn of first group I is given by 2a-2b-3a, and a third turn is formed by 3a-3b-4a.

According to the schematic representation of FIG. 3B, the first turn 1a-1b-2a is assigned a turn diameter d1, the second turn 2a-2b-3a is assigned a turn diameter d2, and the third turn 3a-3b-4a is assigned turn diameter $d_3$. Due to the winding pattern, the following relationship between the turn diameters applies to first group I: $d_1 < d_2 < d_3$.

In illustrative embodiments, a first turn of the second group II is given by 4a-4b-5a, a second turn of the second group II is formed by 5a-5b-6a, and a third turn of the second group II is formed by 6a-6b-7a. According to the schematic representation of FIG. 3B, the first turn 4a-4b-5a is assigned a turn diameter $d_4$, the second turn 5a-5b-6a is assigned a turn diameter d5, and the third turn 6a-6b-7a is assigned a turn diameter d6. Based on the winding pattern, the following relationship between the turn diameters applies to the second group II: $d_4 < d_5 < d_6$.

According to the illustrative embodiments shown in FIG. 3B, the turns in one group are immediately consecutive and contiguous with monotonically increasing turn diameters. This represents no restriction of the present disclosure, and alternatively, the turn diameter may monotonically decrease within a group, for example, by mirroring the numbering by starting out from the terminal contact 257 instead of the terminal contact 256 (which corresponds to an opposite turn direction).

The concept of the groups is uniquely determined by the winding pattern, because the transition from one of groups I, II, III, IV, V to the corresponding adjacent group entails a change in turn diameter opposite to the tendency in the group: For example, the turn diameter of immediately consecutive and cross-group turns 3a-3b-4a and 4a-4b-5a in the transition from group I to group II is as follows: $d_3$ (corresponds to turn diameter of turn 3a-3b-4a)>$d_4$ (corresponds to turn diameter of turn 4a-4b-5a) opposite to the tendency $d_1 < d_2 < d_3$ within the first group I and $d_4 < d_5 < d_6$ within the second group II.

Accordingly, it is also possible to distinguish between further groups III, IV and V of second winding 254 on the basis of the winding pattern.

A corresponding approach is analogously transferred to the winding pattern of first winding 252, which is omitted at this point for reasons of clarity.

According to illustrative embodiments of the present disclosure, the first turn of the first group starting from the terminal contact 256, i.e., turn 1a-1b-2a, is not formed as the outermost turn or as the turn which is arranged closest to the end of the pole section 247 in the width direction B. Instead, the turns of the first group I immediately following the first turn of the first group I toward the end of pole section 247 are successively wound outwardly, so that an increase of the winding diameter within the first group I is provided. The second group II following the first group is wound closer toward the connecting section 211 with respect to the first group I with regard to the embodiment shown in FIG. 3B, wherein the groups shown in the embodiment shown in FIG. 3B starting out from the terminal contact 256 as chronologically wound groups are wound with a larger distance to the end of the pole section 247 and closer to the connecting section 211. This achieves a winding that is interleaved or distributed over the side surfaces, respectively, and provides a uniform and reduced bulge over the side surfaces as compared to non-grouped winding patterns in which the bulge increases monotonically with the coil diameter along the turns.

According to the embodiment illustrated in FIG. 3B, the winding over the top side and the bottom side of the plate-shaped ferrite core 210 may be wound in one layer. Lead sections running over the top side and the bottom side of the plate-shaped ferrite core 210, for example, turn sections 1a-13a and turn sections 1b-13b in FIG. 3B, are here wound in a single layer. This allows a low overall construction height along the thickness direction D of the inductive device 200.

Similar to the inductive device 100 described above with respect to FIGS. 2A-2D, pole sections 241 and 247 according to the illustration in FIG. 3B as well as further pole sections 243, 245, 248, 249 according to the illustration in FIG. 3A are arranged along the thickness direction D offset (with offset) relative to the connecting section 211. The turn sections 1b-13b arranged over the bottom side of the plate-shaped ferrite core 210 are arranged above the connecting section and in particular adjacent to a stepping 272 formed by the offset of the pole section 247 relative to the connecting section 211, so that, firstly, the pole sections 247, 248, 249 are exposed and, secondly, the construction height of the inductive device 200 at the bottom side is not increased beyond a height level of the exposed surface of the pole sections 247, 248, 249. The same applies to the first winding 252 and a stepping 271 between the pole sections 241, 243, 245 and the connecting section 211. This allows for advantageously setting the coupling behavior of the inductive device 200 to a further inductive device, not shown, and maintaining low the construction height of inductive device 200 toward the bottom side of the inductive device 200.

A charging system 300 for charging an electric vehicle 312 is now described with reference to FIG. 4.

Figure 4:
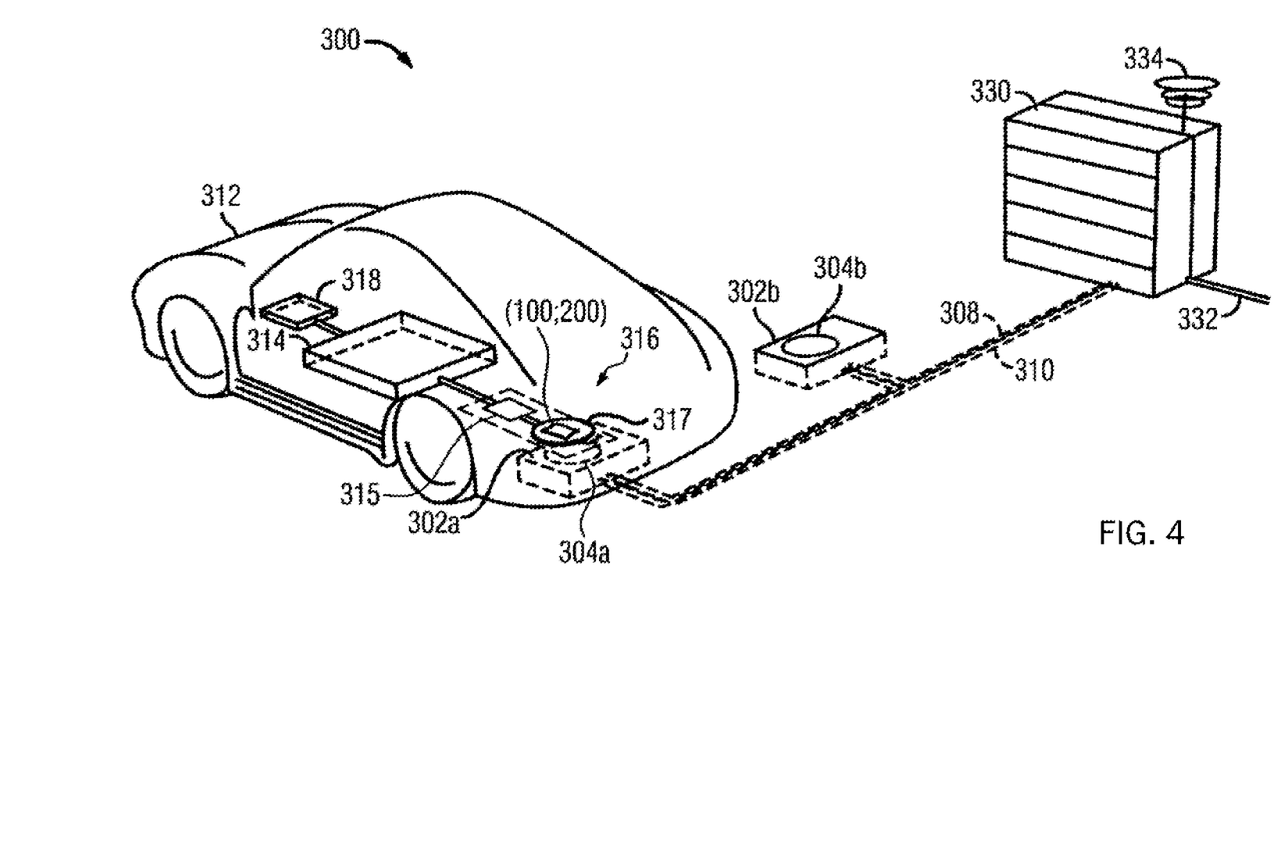
FIG. 4 shows schematically a charging system for charging an electric vehicle according to illustrative embodiments of the disclosure.

As shown in FIG. 4, primary resonator devices 302a and 302b with primary-side inductive devices 304a, 304b are provided in the charging system 300 and may be positioned, for example, in a parking lot or in a garage and recessed into the ground. The primary resonator devices 302a, 302b are connected via corresponding connection lines 308, 310 to a power distribution device 330, which in turn is connected to the mains supply via a lead 332. The power distribution device 330 may comprise, for example, a communication unit 334 that may be in communication with one or more external control units (not shown).

An energy storage device 318 on the part of the vehicle is provided in the electric vehicle 312, for example, a rechargeable battery or a rechargeable system composed of rechargeable battery cells, which is connected via a charge controller 314 to a secondary resonator device 316. The secondary resonator device 316 may comprise, for example, a housing 317 in which an inductive device is received, as described above with respect to FIGS. 2A-3B (see inductive devices 100; 200). The housing 317 may be formed, for example, on the underbody of the electric vehicle 312 for mechanical mounting to the electric vehicle 312. The secondary resonator device 316 may further comprise a capacitive component 315 which, together with the inductive device, forms an electromagnetic resonator circuit.

When parking the electric vehicle 312 over one of the primary resonator devices 302a, 302b, a charging process may be initiated, for example, by communication between the charge controller 314 and the power distribution device 330 via communication device 334, where the primary resonator device is operated, over which the electric vehicle 312 has been parked, in the example of FIG. 4, the primary resonator device 302a. An inductive coupling between the primary resonator device 302a and the secondary resonator device 316 is established by way of near-field transmission and receives electromagnetic energy from the primary resonator device 302a and charges the energy storage 318 via the charge controller 314 (for example, comprising suitable rectifier circuitry). A state of charge of the energy storage 318 may here be monitored by the charge controller 314, and the charging process can be terminated by communication with the power distribution device 330 when a desired state of charge has been reached. The charging system 300 may be configured to detect the presence of an object between the secondary resonator device 316 and the primary resonator device 302a or 302b and, accordingly, a charging process may be interrupted upon detection of a positive event ("object or living being on or too near to primary resonator device").

The invention claimed is:

1. An inductive device comprising a plate-shaped ferrite core and a hybrid double-D solenoid coil that is disposed over said plate-shaped ferrite core and comprises a plurality of turns, wherein said plurality of turns is grouped to at least two groups of at least two immediately consecutive turns each having in one group monotonically increasing or decreasing turn diameters, wherein the last turn of a group has a turn diameter that is larger than that of the first turn of the following group if the turn diameter of the turn immediately preceding the last turn within the group is smaller than the turn diameter of the last turn of the group, or has a turn diameter that is smaller than that of the first turn of the following group if the turn diameter of the turn immediately preceding the last turn within the group is larger than the turn diameter of the last turn of the group.

2. The inductive device according to claim 1, wherein said plate-shaped ferrite core comprises at least one stepping which is at least in part overlaid by said hybrid double-D solenoid coil.

3. The inductive device according to claim wherein said at least one stepping is formed in two oppositely disposed surfaces of said plate-shaped ferrite core which are oriented perpendicular to a thickness direction of said plate-shaped ferrite core, and provides an offset in each of said two oppositely disposed surfaces along the thickness direction.

4. The inductive device according to claim 1, wherein said hybrid double-D solenoid coil comprises a first winding disposed over said plate-shaped ferrite core and having a first plurality of turns and first terminal contacts, and a second winding having a second plurality of turns and second terminal contacts, wherein said first and second terminal contacts are connected to terminals of said inductive device such that, upon a voltage being applied to said terminal contacts, an electric current passing through said first winding and said second winding has a mutually opposite rotational direction.

5. The inductive device according to claim 4, wherein said plate-shaped ferrite core comprises two pole sections, which are arranged at opposite ends of said plate-shaped ferrite core relative to a direction obtained by projecting a turn axis of said first winding and/or said second winding onto said plate-shaped ferrite core, and a connecting section arranged between said pole sections, wherein each pole section is arranged offset from said connecting section along a thickness direction of said plate-shaped ferrite core, while forming a stepping in said ferrite core.

6. The inductive device according to claim 5, wherein each pole section has a pole surface that is at least in part exposed and oriented perpendicular to said thickness direction and is not overlaid by winding sections.

7. The inductive device according to claim 1, wherein said hybrid double-D solenoid coil is wound in a single layer over surfaces of said plate-shaped ferrite core which are oriented perpendicular to a thickness direction of said plate-shaped ferrite core.

8. The inductive device according to claim 1, further comprising a winding element having arranged on a surface of said plate-shaped ferrite core at least one support member which comprises a respective plurality of grooves, each of which receiving exactly one turn section of the turns arranged over said support member.

9. The inductive device according to claim 1, wherein lead sections extending from terminal contacts to turns are routed laterally on the inside and said lead sections are overlaid by turn sections.

10. A secondary resonator device for mounting to an electric motor vehicle comprising a housing, a capacitive component and said inductive device according to claim 1, wherein at least said inductive device is accommodated into said housing.

* * * * *

UNITED STATES PATENT AND TRADEMARK OFFICE
CERTIFICATE OF CORRECTION

PATENT NO. : 11,367,568 B2
APPLICATION NO. : 16/464512
DATED : June 21, 2022
INVENTOR(S) : Mathias Weber et al.

It is certified that error appears in the above-identified patent and that said Letters Patent is hereby corrected as shown below:

In the Claims

Column 14, Line 5, Claim 3:
After "The inductive device according to claim"
Insert --2,--.

Signed and Sealed this
Eighteenth Day of April, 2023

Katherine Kelly Vidal
*Director of the United States Patent and Trademark Office*